(12) United States Patent
Antoni et al.

(10) Patent No.: US 9,644,576 B2
(45) Date of Patent: May 9, 2017

(54) EXHAUST GAS FEED DEVICE FOR AN INTERNAL COMBUSTION ENGINE

(71) Applicant: PIERBURG GMBH, Neuss (DE)

(72) Inventors: Christian Antoni, Cologne (DE); Bernhard Bronischewski, Krefeld (DE); Wolfgang Kohnen, Alsdorf (DE)

(73) Assignee: PIERBURG GMBH, Neuss (DE)

( * ) Notice: Subject to any disclaimer, the term of this patent is extended or adjusted under 35 U.S.C. 154(b) by 125 days.

(21) Appl. No.: 14/382,553

(22) PCT Filed: Jan. 22, 2013

(86) PCT No.: PCT/EP2013/051076
§ 371 (c)(1),
(2) Date: Sep. 3, 2014

(87) PCT Pub. No.: WO2013/131674
PCT Pub. Date: Sep. 12, 2013

(65) Prior Publication Data
US 2015/0027420 A1    Jan. 29, 2015

(30) Foreign Application Priority Data
Mar. 6, 2012  (DE) .................. 10 2012 101 851

(51) Int. Cl.
*F02M 25/07* (2006.01)
*F02M 35/10* (2006.01)
(52) U.S. Cl.
CPC ......... *F02M 25/0771* (2013.01); *F02M 26/19* (2016.02); *F02M 26/21* (2016.02); *F02M 26/54* (2016.02); *F02M 26/66* (2016.02); *F02M 26/68* (2016.02); *F02M 35/10222* (2013.01); *Y02T 10/146* (2013.01)

(58) Field of Classification Search
CPC ........... F02M 25/077; F02M 25/0787; F02M 25/079; F02M 25/0793; F02M 25/0794; F02M 35/10222; F02M 26/19; F02M 26/21; F02M 26/54; F02M 26/66; F02M 26/68
See application file for complete search history.

(56) References Cited

U.S. PATENT DOCUMENTS

| 4,177,780 A * | 12/1979 | Pellerin ................. F02M 29/04 123/590 |
| 5,749,350 A | 5/1998 | Bender |
| 7,743,756 B2 | 6/2010 | Styles et al. |
| 2003/0111066 A1 * | 6/2003 | Veinotte ............. F02M 25/0724 123/568.18 |

(Continued)

FOREIGN PATENT DOCUMENTS

| DE | 44 20 247 A1 | 12/1995 |
| DE | 196 03 592 C1 | 5/1997 |
| DE | 10 2004 025 184 A1 | 12/2005 |

(Continued)

*Primary Examiner* — Jacob Amick
(74) *Attorney, Agent, or Firm* — Norman B. Thot

(57) ABSTRACT

An exhaust gas feed device for an internal combustion engine includes an exhaust gas recirculation duct comprising an end, an outlet, and an outflow cross-section. An air intake duct opens into the exhaust gas recirculation duct. A flow-guiding element is arranged in and at the end of the exhaust gas recirculation duct. An exhaust gas recirculation valve comprises a regulator body. The regulator body is configured to control the outflow cross-section. A valve seat is arranged at the outlet at the end of the exhaust gas recirculation duct in which the flow-guiding element is arranged. The valve seat is configured to limit the outflow cross-section of the exhaust gas recirculation duct.

6 Claims, 2 Drawing Sheets

(56) References Cited

U.S. PATENT DOCUMENTS

2007/0181106 A1    8/2007    Koster et al.
2010/0065028 A1    3/2010    Styles et al.

FOREIGN PATENT DOCUMENTS

| | | |
|---|---|---|
| DE | 10 2009 057 497 A1 | 6/2011 |
| FR | 2 861 137 A1 | 4/2005 |
| FR | 2 917 131 A1 | 12/2008 |
| JP | 55-60649 A | 5/1980 |
| JP | 2007-285163 A | 11/2007 |
| JP | 2009-156043 A | 7/2009 |
| JP | 2010-71127 A | 4/2010 |
| JP | 2011/38453 A | 2/2011 |
| JP | 2011/74841 A | 4/2011 |
| KR | 10-2007-0092519 A | 9/2007 |
| WO | WO 2006/126963 A1 | 11/2006 |
| WO | WO 2011/048540 A1 | 4/2011 |

* cited by examiner

EXHAUST GAS FEED DEVICE FOR AN INTERNAL COMBUSTION ENGINE

CROSS REFERENCE TO PRIOR APPLICATIONS

This application is a U.S. National Phase application under 35 U.S.C. §371 of International Application No. PCT/EP2013/051076, filed on Jan. 22, 2013 and which claims benefit to German Patent Application No. 10 2012 101 851.0, filed on Mar. 6, 2012. The International Application was published in German on Sep. 12, 2013 as WO 2013/131674 A1 under PCT Article 21(2).

FIELD

The present invention relates to an exhaust gas feed device for an internal combustion engine, comprising an exhaust gas recirculation duct, an air intake duct into which the exhaust gas recirculation duct opens, and a flow-guiding element that is arranged in the exhaust gas recirculation duct at one end thereof.

BACKGROUND

Such exhaust gas feed devices have previously been described in a number of applications. The purpose of these feed devices is to provide a good mixing of the exhaust gas flow with the air flow. It must be provided, however, that a sufficient pressure gradient be maintained in the exhaust gas recirculation duct so that sufficiently large quantities of exhaust gas can be recirculated. Significant pressure losses must therefore be avoided.

Besides feed devices which are formed by a slotted duct wall, for example, through which exhaust gas can flow radially from a surrounding ring duct into the air intake duct, as described, for example, in DE 44 20 247 A1, static mixers have also been described which provide for sufficient mixing after exhaust gas has been fed into the air flow. A plate-shaped static mixer is described, for example, in DE 10 2004 025 184 A1.

Another static mixer is described in U.S. Pat. No. 7,743, 756 B2. This mixer has an inner exhaust gas recirculation duct with radial outflow openings behind which swirl-generating vanes are formed through which the mixed exhaust gas airflow passes so that turbulence is caused which is intended to result in a homogenization of the mixture immediately in front of the throttle.

With such a mixing by means of static mixers, previously existing strands of a gas in the gas mixture might be deflected in the same manner as the surrounding gas so that a satisfactory mixing is still not achieved. Mixing by means of a radial feed provides for a relatively good mixing while, however, resulting in a high pressure loss.

The quantity regulation for the fed exhaust gas flow is also located at a distance from the feed location so that pulsations and pressure differences in the downstream exhaust gas system make an accurate regulation difficult.

SUMMARY

An aspect of the present invention is to provide a good mixing of the exhaust gas flow and the airflow with low pressure losses and a precise controllability of the recirculated exhaust gas quantity. The structural space required therefor should be as small as possible and the assembly should be simple. It is intended that, by a homogeneous distribution of the exhaust gas in the airflow, the thermal stress on downstream components is reduced by reducing temperature peaks.

In an embodiment, the present invention provides an exhaust gas feed device for an internal combustion engine which includes an exhaust gas recirculation duct comprising an end, an outlet, and an outflow cross-section. An air intake duct opens into the exhaust gas recirculation duct. A flow-guiding element is arranged in and at the end of the exhaust gas recirculation duct. An exhaust gas recirculation valve comprises a regulator body. The regulator body is configured to control the outflow cross-section. A valve seat is arranged at the outlet at the end of the exhaust gas recirculation duct in which the flow-guiding element is arranged. The valve seat is configured to limit the outflow cross-section of the exhaust gas recirculation duct.

BRIEF DESCRIPTION OF THE DRAWINGS

The present invention is described in greater detail below on the basis of embodiments and of the drawings in which.

DETAILED DESCRIPTION

Figure 1:
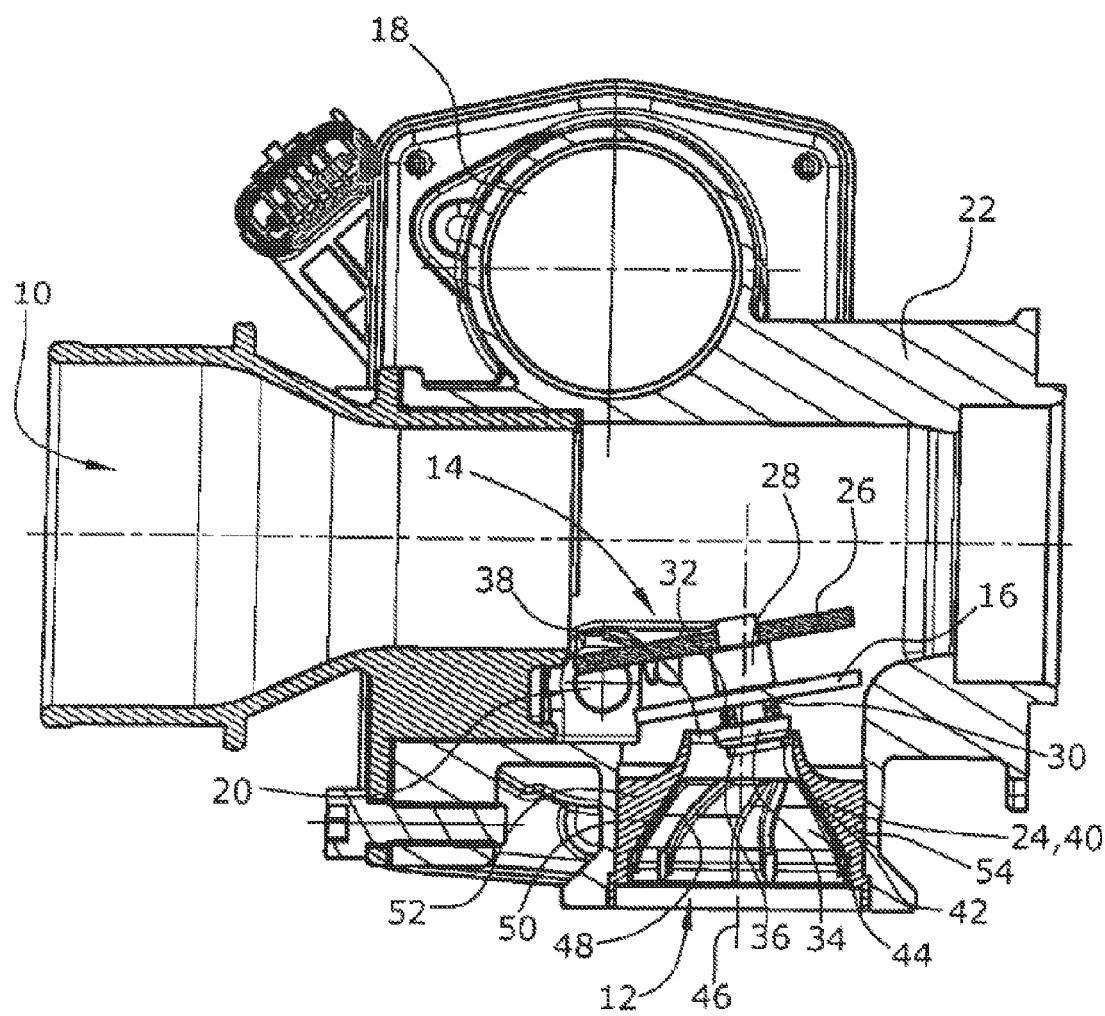
FIG. 1 shows a side elevational view of an exhaust gas feed device according to the present invention, shown in section.

Because a valve seat is formed at an outlet at the end of the exhaust gas recirculation duct in which the flow-guiding element is arranged, wherein the valve seat delimits an outflow cross section of the exhaust gas recirculation duct, which cross section is controlled through a regulator body of an exhaust gas recirculation valve, a swirl for improving the mixing is imposed on the exhaust gas, for example, immediately before it enters the airflow, so as to provide a precise controllability of the recirculated exhaust gas quantity. This significantly enhances mixing and prevents a thermal overload on downstream components due to temperature peaks. The structural space required and the pressure loss occurring are furthermore small.

In an embodiment of the present invention, the outflow cross section of the exhaust gas recirculation duct can, for example, include an angle of between 30° to 90° with the flow cross section of the air intake duct. The angle of the inflowing exhaust gas flow is accordingly at least 30° with respect to the airflow, whereby parallel stratified flows are avoided.

In an embodiment of the present invention, the regulator body can, for example, be an eccentrically supported flap whose rotary axis is arranged upstream with respect to the airflow of the outflow cross section of the exhaust gas recirculation duct. A deflection in the direction of the airflow is created by the partly open flap, whereby excessive flow resistances, and thereby, pressure losses, are avoided.

The end of the exhaust gas recirculation duct in which the flow-guiding element is arranged is designed to taper in a truncated cone shape towards the outlet. This narrowing of the cross section causes an increase in flow velocity and, as a consequence, leads to a turbulent flow, which in turn causes an improvement in the mixing during the inflow into the air duct.

In an embodiment of the present invention, the flow-guiding element can, for example, be designed as a swirl generator since an exhaust gas flow with a swirl generates particularly high turbulences in the linear airflow, thereby enhancing homogenization.

In an embodiment of the present invention, which is a development of the above, the swirl generator can, for example, have vanes extending radially towards a surrounding side wall of the exhaust gas recirculation duct and which, when seen in the main flow direction, have a growing component in the circumferential direction. It is thereby possible to impart a strong swirl to the flow while the pressure loss is as low as possible.

In an embodiment of the present invention, which is a further development of the above, the swirl generator can, for example, have a central axle to which the vanes are fastened that extend in the radial direction up to the surrounding side wall of the end of the exhaust gas recirculation duct. Such a swirl generator is simple to produce and to assemble. The formation of a central non-swirling strand in the flow is avoided.

An easy assembly due to the possibility of a pre-assembly outside the exhaust gas duct is obtained if the swirl generator is fastened in a duct section that is inserted into the end of the exhaust gas recirculation duct together with the swirl generator.

A further reduction in assembly effort is achieved by manufacturing the swirl generator integrally with the surrounding duct section.

An exhaust gas feed device is thus provided which provides a very good homogenization of the exhaust gas/air mixture with low pressure losses. This results in a reduction of temperature peaks at downstream components. The structure is simple and cost-effective. The structural space required to provide sufficient mixing is reduced.

An embodiment of an exhaust gas feed device according to the present invention is illustrated in the drawings and will be described hereinafter.

The exhaust gas feed device of the present invention consists of an air intake duct 10 into which air is drawn for combustion in an internal combustion engine, the air being drawn through an upstream filter (not illustrated) towards a compressor of a turbocharger. In the case of low-pressure exhaust gas recirculation, recirculated exhaust gas is fed into the air intake duct 10 upstream of the compressor.

This is done via an exhaust gas recirculation duct 12 which, in the present embodiment, opens into the air intake duct 10 at a right angle thereto. The quantity of exhaust gas recirculated is controlled through an exhaust gas recirculation valve 14 whose regulator body is formed in the present embodiment by an eccentrically supported flap 16.

The exhaust gas recirculation valve 14 has an actuator 18 in the form of an electric motor with a downstream transmission, the motor being adapted to rotate a shaft 20 serving as a rotary axis. This shaft 20 is supported on both sides in the housing 22 of the air intake duct 10 at a location upstream of an outlet 24 of the exhaust gas recirculation duct 12 and, on one side, passes through the housing 22 for connection to the transmission of the actuator 18. The shaft 20 is mounted with a lever 26 that may be designed as a flap body for regulating the flow cross section of the air intake channel 10 and thus for throttling the airflow.

A holding axle 28 is mounted centrally on the lever 26, which holding axle 28 extends vertically to the lever 26 and centrally penetrates the eccentrically supported flap 16. The lever 26 has a step 30 against which the eccentrically supported flap 16 is pressed via a helical spring 32. For this purpose, an annular body 34 is arranged at the end of the holding axle 28, against which the helical spring 32 abuts with its end that is opposite the eccentrically supported flap 16. This annular body 34 is fastened on the holding axle 28 by means of a retaining ring 36 mounted in a groove in the holding axle 28. Owing to this structure, the eccentrically supported flap 16 can be tilted to a small degree relative to the (parallel) lever 26, whereby it is provided that the eccentrically supported flap 16 rests on a valve seat 40, for example, in a manner closed all around, the valve seat 40 surrounding an outflow cross section 38 of the exhaust gas recirculation duct 12.

The valve seat 40 is located at the outlet 24 of the exhaust gas recirculation duct 12. The end 42 of the exhaust gas recirculation duct 12 has a truncated cone shape or a constriction directed towards the outlet 24, whereby the outflow velocity of the exhaust gas flow is increased at the outflow cross section.

Figure 2:
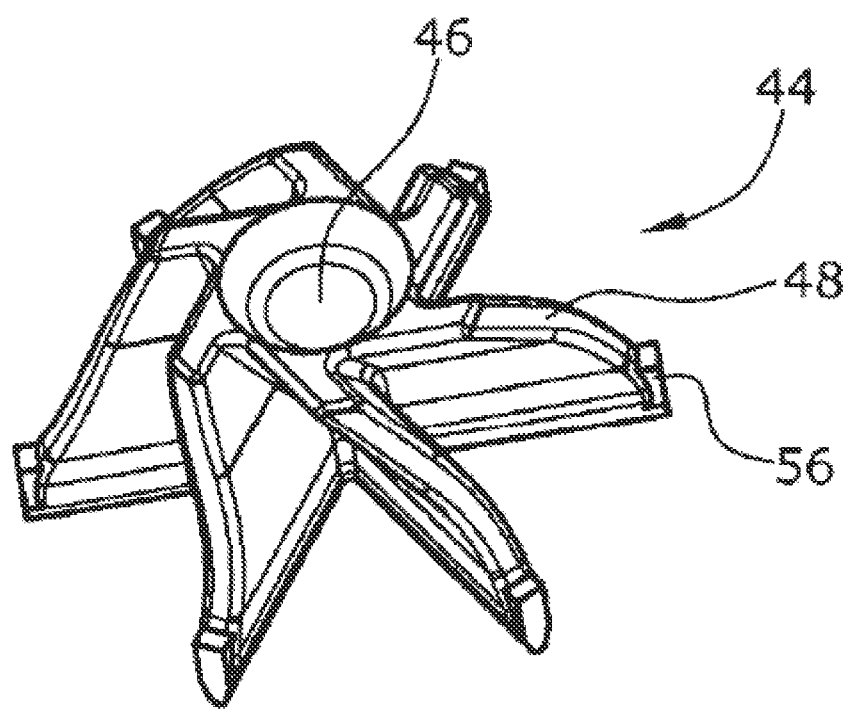
FIG. 2 shows a three-dimensional illustration of a swirl generator of the present exhaust gas feed device in FIG. 1.

According to the present invention, a flow-guiding element in the form of a swirl generator 44, such as illustrated in FIG. 2, is arranged in the end 42 of the exhaust gas recirculation duct 12. The swirl generator 44 consists of a central closed axle 46 arranged concentrically with respect to the end 42 of the exhaust gas recirculation duct 12, with vanes 48 extending radially outward from the axle and along the central closed axle 46, wherein the vanes 48 additionally have a steadily increasing curvature towards the central closed axle 46, i.e., a component in the circumferential direction. In the present embodiment, six such vanes 48 are fastened to the central closed axle 46. Corresponding to the constriction of the end 42 of the exhaust gas recirculation duct 12, the radial extension of the vanes 48 also becomes smaller in the direction of the central closed axle 46 so that the vanes 48 respectively extend up to the surrounding side wall 50 of the surrounding duct section 52 forming the end 42 of the exhaust gas recirculation duct 12, which surrounding duct section 52, in the present embodiment, is inserted into a correspondingly shaped opening 54 of the housing 22 as a separate component and is thereafter connected with the downstream exhaust gas recirculation duct 12. The duct section 52 can be fastened in the housing 22, for example, by welding. The swirl generator 44 may likewise be fastened in advance in the surrounding duct section 52 by welding using protrusions 56 at the end of the vanes 48. Other purely form-fitting fastening devices, such as, for example, a flange connection with the downstream exhaust gas recirculation duct 12, are also conceivable.

The swirl generator 44 imparts a tangential component to an exhaust gas flow, which flows into the exhaust gas recirculation duct 12 in dependence on the position of the eccentrically supported flap 16 so as to generate a rotating exhaust gas flow. Only little pressure loss occurs owing to the continuous configuration of the vanes 48. Depending on the position of the eccentrically supported flap 16, this exhaust gas flow will subsequently be deflected in different degrees into the main flow direction of airflow taken in, wherein the inflow velocity is significantly increased by the cross section of the exhaust gas recirculation duct 12 which also constantly decreases for the purpose of reducing pressure losses. The flow is accordingly a turbulent flow that also generates turbulences in the air intake duct 10 as it flows therein, whereby a very good mixing of the exhaust gas flow with the airflow is achieved without the formation of exhaust gas strands. This significantly reduces the thermal stress on downstream components, since local temperature peaks are avoided.

A very good mixing is thus achieved in a very small structural space for turbulence generation since the turbulences are not imparted by a component to the entire gas flow, but only to the exhaust gas flow. A simple assembly is further achieved.

The scope of protection is not restricted to the embodiment described. Besides the described swirl generator, other flow-guiding elements can be used to generate turbulence in the air intake duct. The fastening of the flow-guiding element can likewise be achieved in another manner, for example, the flow-guiding element can be made integrally with the surrounding duct walls. The exhaust gas recirculation duct can further open into the air intake duct under a different angle and the exhaust gas recirculation valve can be arranged so that the influence of the valve on the air flow is as small as possible, i.e., the opening is still realized within the end of the exhaust gas recirculation duct.

The present invention is not limited to embodiments described herein; reference should be had to the appended claims.

What is claimed is:

1. An exhaust gas feed device for an internal combustion engine, the exhaust gas feed device comprising:
    an exhaust gas recirculation duct comprising an end, an outlet, and an outflow cross-section;
    an air intake duct into which the exhaust gas recirculation duct opens;
    a flow-guiding element provided as a swirl generator, the flow-guiding element being arranged in and at the end of the exhaust gas recirculation duct;
    an exhaust gas recirculation valve comprising a regulator body, the regulator body being configured to control the outflow cross-section; and
    a valve seat arranged at the outlet at the end of the exhaust gas recirculation duct in which the flow-guiding element is arranged, the valve seat being configured to limit the outflow cross-section of the exhaust gas recirculation duct,
    wherein, the end of the exhaust gas recirculation duct, in which the flow-guiding element is arranged, is arranged to taper in a frustoconical shape towards the outlet,
    the exhaust gas recirculation duct further comprises a surrounding side wall arranged at the end, and
    the swirl generator comprises vanes arranged to extend radially towards the surrounding side wall of the exhaust recirculation duct and a central axle to which the vanes are fastened, the vanes comprising an angle to the central axle which increases in a circumferential direction, as seen in a flow direction of an exhaust gas, and being configured to extend to the surrounding side wall of the exhaust gas recirculation duct.

2. The exhaust gas feed device as recited in claim 1, wherein
    the air intake duct comprises a flow cross section, and
    the outflow cross section of the exhaust gas recirculation duct includes an angle which is between 30° and 90° with the flow cross section of the air intake duct.

3. The exhaust gas feed device as recited in claim 1, wherein the regulator body is an eccentrically supported flap comprising a rotary axis which is arranged upstream with respect to a flow direction of an exhaust gas through the outflow cross section of the exhaust gas recirculation duct.

4. The exhaust gas feed device as recited in claim 1, wherein,
    the air intake duct comprises a housing which comprises an opening,
    and further comprising a duct section which is inserted into the opening of the housing,
    wherein, the swirl generator is fastened inside the duct section so that the swirl generator and the duct section are each inserted into the opening of the housing of the air intake duct.

5. The exhaust gas feed device as recited in claim 4, wherein the swirl generator is configured to be integral with the duct section.

6. An exhaust gas feed device for an internal combustion engine, the exhaust gas feed device comprising:
    an exhaust gas recirculation duct comprising an end, a surrounding side wall arranged at the end, an outlet, and an outflow cross-section, the surrounding side wall being non-permeable;
    an air intake duct into which the exhaust gas recirculation duct opens;
    a flow-guiding element provided as a swirl generator, the flow-guiding element being arranged in and at the end of the exhaust gas recirculation duct;
    an exhaust gas recirculation valve comprising a regulator body, the regulator body being configured to control the outflow cross-section; and
    a valve seat arranged at the outlet at the end of the exhaust gas recirculation duct in which the flow-guiding element is arranged, the valve seat being configured to limit the outflow cross-section of the exhaust gas recirculation duct,
    wherein,
    the end of the exhaust gas recirculation duct, in which the flow-guiding element is arranged, comprises solid walls is arranged to taper in a frustoconical shape towards the outlet,
    the exhaust gas recirculation duct further comprises a surrounding side wall arranged at the end, and
    the swirl generator comprises vanes arranged to extend radially towards the surrounding side wall of the exhaust recirculation duct and a central axle to which the vanes are fastened, the vanes comprising an angle to the central axle which increases in a circumferential direction, as seen in a flow direction of an exhaust gas, and being configured to extend to the surrounding side wall of the exhaust gas recirculation duct.

* * * * *